INVENTORS
PAUL M. THRASHER
RICHARD J. WARD

FIG. 7a
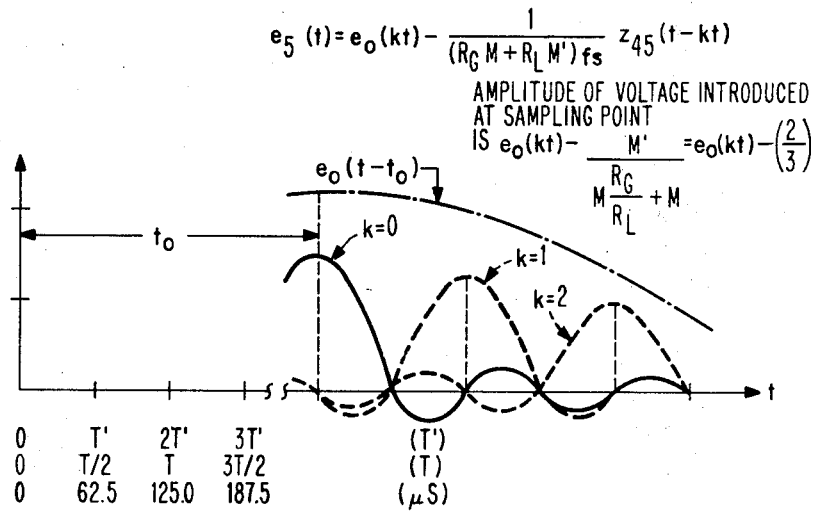
FIG. 7c
PERTINANT DATA FOR PLOTS
$f_s = 8000$ CPS
W OF INPUT FILTER = $f_s/2$ = 4000 CPS
W OF OUTPUT FILTER = $\frac{2f_s}{2}$ = 8000 CPS
T = 125 MS
T = $\frac{125}{2}$ = 62.5 MS
FREQUENCY OF OPEN CIRCUITED OUTPUT OF INPUT FILTER IS: 500 CPS
M = 1      $R_G = R_L$
M' = 2
FIG. 7b
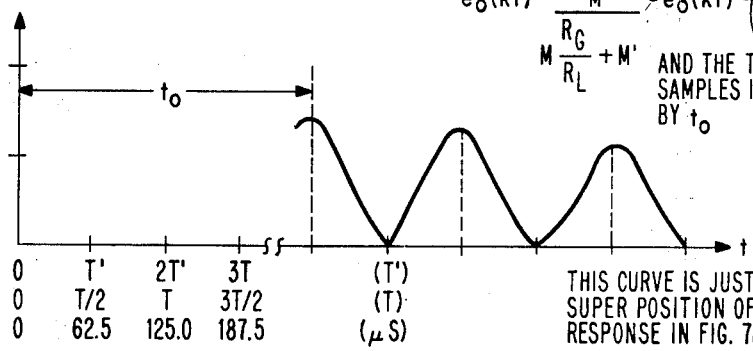

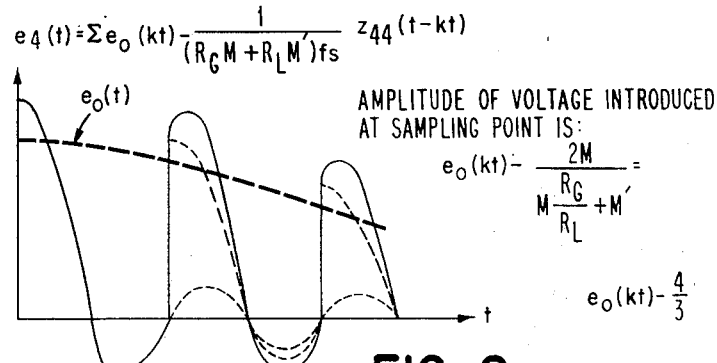
FIG. 8a
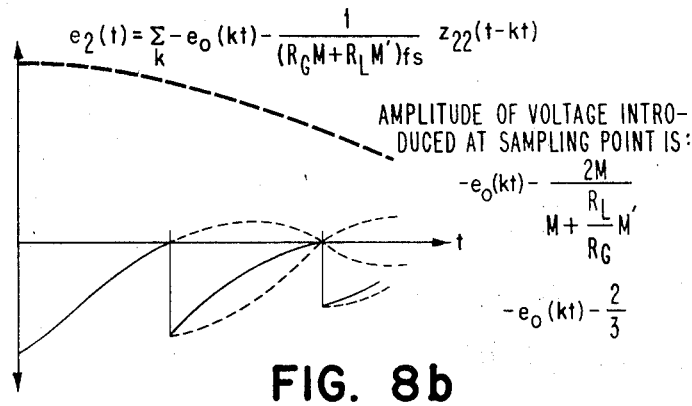
FIG. 8b
PERTINENT DATA FOR PLOTS
$f_s = 8000$ cps
W OF INPUT FILTER = $f_s/2 = 4000$ cps
W OF OUTPUT FILTER = $\dfrac{2f_s}{2} = 8000$ cps
$T = 125 \mu s$
$T = \dfrac{125}{2} = 62.5$ MS
FREQUENCY OF OPEN CIRCUITED OUTPUT OF INPUT FILTER IS:
500 cps
$M = 1$
$M' = 2$
$R_G = R_L$
FIG. 8d
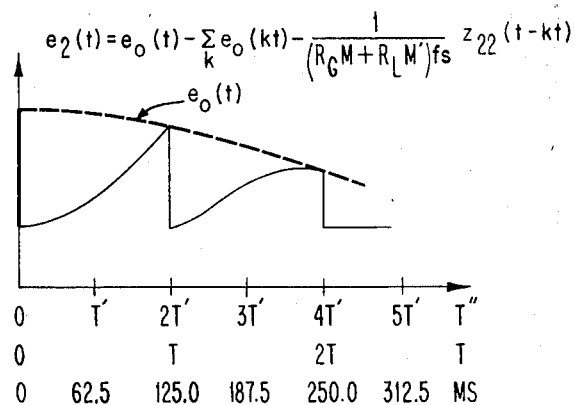
FIG. 8c United States Patent Office 3,520,998
Patented July 21, 1970

3,520,998
RESONANT TRANSFER OF ENERGY BETWEEN BANDPASS FILTERS OF UNEQUAL BANDWIDTH
Paul M. Thrasher, Bethesda, and Richard J. Ward, Rockville, Md., assignors to International Business Machines Corporation, Armonk, N.Y., a corporation of New York
Filed Nov. 1, 1966, Ser. No. 591,316
Int. Cl. H04j 3/00
U.S. Cl. 179—15                                    20 Claims

ABSTRACT OF THE DISCLOSURE

A circuit for accomplishing an essentially lossless resonant transfer of energy from a first bandpass filter to a second bandpass filter wherein the filters are of unequal bandwidth; and a multichannel switching system including a first plurality of bandpass filters, a second plurality of bandpass filters, and a switch means interconnecting one of said first plurality of bandpass filters to one of said second plurality of bandpass filters for effectuating an essentially lossless resonant transfer of energy wherein the first bandpass filter and a corresponding second bandpass filter each have different bandwidths.

---

The invention herein described was made in the course of or under a contract with the Department of the Air Force.

This invention relates to resonant transfer switching circuits and more particularly to circuits for swtching information in an ideally lossless manner between filters of unequal bandwidths by resonant transfer techniques. Resonant transfer as used in this application refers to the provision of a voltage at a reference time across a first capacitor equal to a voltage across a second capacitor at some later time, as explained in greater detail in U.S. Pat. No. 3,359,370, filed June 5, 1964, which patent is assigned to the assignee of the present invention.

Resonant transfer between filters is known in the prior art. However, resonant transfer between filters has in the past been limited to filters of equal bandwidth. That is, resonant transfer switching could be effected between an input filter and an output filter only if each filter was of the same bandwidth.

Resonant transfer finds important application in information switching in modern communication systems. It is more commonly called circuit switching when used in voice communication systems. In such systems provision must be made for handling two types of messages; i.e., local and long distance. Incoming signals on local lines must be switched to either an outgoing local line or a long distance line. Similarly, incoming long distance signals must be switched to either outgoing local lines or long distance lines.

However, because of the prior art limitation that the filters must be of equal bandwidth, previous single sideband communication systems utilizing resonant transfer were of the frequency multiplex type. That is, each incoming line contained a band limiting input filter, and modulation was effected by resonant transfer switching to another band selecting filter in the outgoing line. Hence, this frequency multiplexing scheme had the disadvantage of requiring two filters for each line, and was thus quite expensive.

The ability to effect ideally lossless resonant transfer between filters of unequal bandwidth now makes it possible to time-multiplex several input filters into a single wideband filter. Thus, an ideally lossless time-multiplexed communication system utilizing resonant transfer techniques can be constructed. In the prior art frequency mulplexed resonant transfer communication systems the channels were separated by frequency and the basic system demodulation mechanism which was required consisted of a bank of bandpass filters and a bank of sampling switches. In a time-multiplexed resonant transfer communication system, however, the individual channels are separated by time, and the basic system demodulation mechanism is a bank of time-multiplexed switches and a single wideband filter. Thus, the time-multiplexed system has the advantage of replacing a bank of band selecting filters with a single wideband filter.

Accordingly, it is a general object of this invention to eliminate the disadvantages associated with prior art resonant transfer circuit switching.

Another object of this invention is to accomplish ideally lossless resonant transfer between filters of unequal bandwidth.

A more particular object of this invention is to accomplish ideally lossless resonant transfer time-multiplexing of several input filters into a single wideband filter.

A still more particular object of this invention is to construct an ideally lossless resonant transfer communication system which eliminates the need for more than one filter in each channel.

Briefly stated, the invention comprises a resonant transfer circuit wherein an input filter having a first bandwidth is interconnected by periodically operated sampling switch means to an output filter having a second bandwidth different from said first bandwidth, such that a signal is completely transferred in an ideally lossless fashion from said input filter to said output filter. The input and output filters are of either low pass or bandpass type.

The invention offers a number of distinct advantages. In particular, the resonant transfer circuit enables an information signal to be transferred directly from one filter to another of different bandwidth. Because of this ability, it is now possible to time-multiplex information signals from a number of different input filters into a signal wideband filter by means of ideally lossless resonant transfer techniques. The present invention allows the implementation of a time-multiplex system, the requisite modulation mechanism of which comprises a bank of sampling switches and a single wideband. This results in substantial hardware savings, while the system performs in an ideally lossless manner.

The foregoing and other objects, features and advantages of the invention will be apparent from the following more particular description of the invention as illustrated in the accompanying drawings.

In the drawings:
FIG. 1 represents a general filter.
FIG. 2 shows the general filter of FIG. 1 connected for reverse open circuited operation.
FIG. 3 represents the basic resonant transfer circuit of my invention for effecting resonant transfer between two filters of unequal bandwidth.
FIG. 4a is a graphical representation of the unit impulse response at point 5 of the circuit of FIG. 3.
FIG. 4b is a graphical representation of the weighted impulse response at point 5 of the circuit of FIG. 3.
FIG. 5a is a graphical representation of the unit impulse response at point 4 of the circuit of FIG. 3.
FIG. 5b is a graphical representation of the weighted impulse response at point 4 of the circuit of FIG. 3.
FIG. 6a is a graphical representation of the unit impulse response at point 2 of the circuit of FIG. 3.
FIG. 6b is a graphical representation of the weighted impulse response at point 2 of the circuit of FIG. 3.
FIG. 7a is a graphical representation of the weighted impulse responses in the superposition process at point 5 of FIG. 3.

FIG. 7b is a graphical representation of the total response resulting from the superposition process at point 5 of the circuit in FIG. 3.

FIG. 7c is pertinent data relative to the graphical representations of FIGS. 7a and 7b.

FIG. 8a is a graphical representation of the total response, also showing the individual impulse responses, resulting from the superposition process at point 4 of the circuit of FIG. 3.

FIG. 8b is a graphical representation of the partial response, also showing the individual impulse responses, resulting from the superposition process at point 2 of the circuit of FIG. 3.

FIG. 8c is a graphical representation of the total response resulting from the superposition process at point 2 of the circuit of FIG. 3.

FIG. 8d is pertinent data relative to the graphical representations of FIGS. 8a, 8b, and 8c.

DESCRIPTION OF RESONANT TRANSFER CIRCUIT

Figure 3:
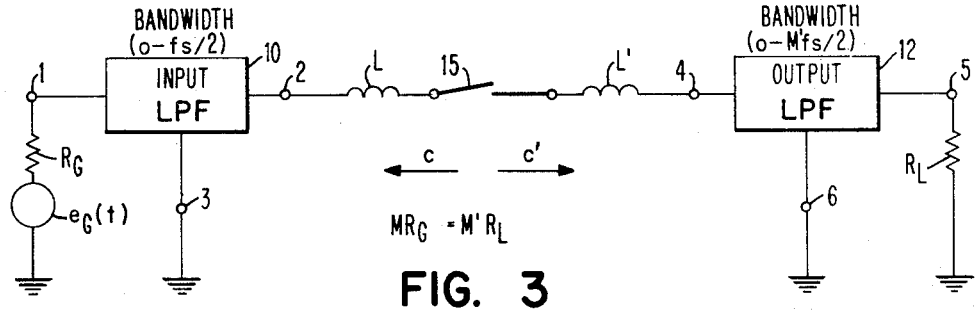

As seen in FIG. 3, the resonant transfer circuit of this invention comprises an input filter 10, a sampling gate 15 and an output filter 12, each filter being of different bandwidth from the other. A source of signals $e_G(t)$ having resistance $R_G$ is connected to input 1, the input of filter 10. Output 2 of the input filter is connected via inductor L to one side of sampling switch 15. The other side of the sampling switch is connected via inductor L′ to the input 4 of output filter 12. The output 5 of the output filter is connected to a load resistance $R_L$. Sampling switch 15 is periodically operated at a sampling frequency $f_s$. The bandwidth of the input filter 10 is different from that of the output filter 12. In the circuit of FIG. 3, the well known conditions for resonant transfer between filters of equal bandwidth, as explained in the above copending application, are assumed. In addition, to effect resonant transfer between filters of unequal bandwidth, the component values of the filters must be chosen such that each bandwidth is an integral half multiple of the sampling frequency $f_s$ and the high edge of its passband is an integral multiple of its bandwidth. Stated another way, the bandwidth and passband of each filter must be such that:

$$W = \frac{mf_s}{2}$$

$$\text{High edge of pass band} = \frac{nmf_s}{2} \quad (1)$$

where W is the bandwidth of the filter, m and n are integral positive numbers.

It can be shown that the above restrictions on the bandwidth and placement of the filters insure that the proper initial conditions are met. That is, when the filters are connected in a resonant transfer mode of operation, as in FIG. 3, the voltage at the input of the output filter will always be passing through zero at the sampling instants and the voltage at the output of the input filter will always be at the level of the input voltage at the sampling instants. This will subsequently be made evident.

For ideally lossless transmission, the value of m for the input filter multiplied by $R_G$ should be equal to the value of m for the output filter multiplied by $R_L$. Stated another way, if the value of m for the input filter is designated as M, and the value of m for the output is designated as M′, then ideally lossless transmission is achieved if the hardware component values of the filters are chosen such that:

$$MR_G = M'R_L \quad (1a)$$

For the sake of illustration, each filter 10 and 12 is shown as being low pass, but as will subsequently be made evident, either filter can be low pass or bandpass.

OPERATION OF RESONANT TRANSFER CIRCUIT

In operation, the energy storage means of each filter is initially completely discharged. An incoming information signal from signal source $e_G(t)$ passes from the input 1 to the output 2 of the input filter 10. The signal is sampled by switch 15 at a rate $f_s$, thereby transferring a sample of the signal to the energy storage circuit of the output filter once during each sampling cycle $1/f_s$. During a sampling cycle switch 15 is held open until the incoming information signal charges the energy storage means in the input filter. At the precise instant that the energy storage means of the input filter becomes completely charged, the switch 15 is closed for a time $\tau$. During this time the energy storage means of the input filter discharges through the switch 15 and current flows in the resonant transfer circuit in the direction of the output filter. The energy storage circuit of the output filter then accepts the charge from the energy storage circuit of the input filter. Since, at the time of switch closure, the energy storage circuit in the input filter was completely charged, and the energy storage circuit in the output filter was completely discharged, the energy flow is completely unidirectional; i.e., from input side to output side. There is a complete and ideally lossless transfer of energy from the input filter having a first bandwidth to the output filter having a second bandwidth different from said first bandwidth. After the energy transfer has taken place, the switch is opened. The energy storage circuit in the input filter is now recharged while the energy storage circuit in the output filter discharges through some utilization circuit and the sampling cycle begins again. Thus, the incoming information signal is transferred directly from one filter to another of different bandwidth in an ideally lossless fashion.

Figure 1:
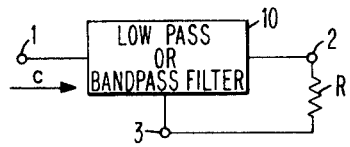

In order to better understand the operation of the hardware of FIG. 3, the following is an explanation of the basic theory underlying resonant transfer between filters of unequal bandwidth. First, the filters of FIG. 3 are ideal filters such as the filter represented by FIG. 1. In that figure, filter 10 has input 1, output 2, common terminal 3 and load resistance R. The filter is ideal in the sense that:

$$Z_{12} = \frac{E_2}{I_1} = \begin{cases} Re^{-j\omega t_0} & \text{within the band} \\ 0 & \text{elsewhere} \end{cases} \quad (2)$$

where $Z_{12}$ is the transfer impedance of the filter,
$E_2$ is the voltage at terminal 2,
$I_1$ is the current into terminal 1,
$\omega$ is radian frequency of an applied signal,
$t_0$ is the phase shift constant of the filter.

This condition is well approximated in practice. The above statement leads to the expression:

$$ReZ_{11} = \begin{cases} R & \text{within the band} \\ 0 & \text{elsewhere} \end{cases} \quad (3)$$

where $Z_{11}$ is the driving point, or input, impedance of the filter,
R is the load resistance of the filter.

In accordance with the invention, and as mentioned above, the bandwidth of each filter of FIG. 3, and its placement along the frequency axis are defined in terms of the sampling frequency $f_S$.

In Equation 1, the choice of $n$ places the filter along the frequency axis, and the choice of $m$ sets its bandwidth. For example, for $n=1$ and $m=1$ the band becomes zero to $f_S/2$, or for $n=1$ and $m=12$, the band becomes zero to $12f_S/2$. If $n$ is greater than one then the filter is always a bandpass one. To further explain the theory underlying the operation of FIG. 3, two unit current impulse responses are desired:

$$Z_{11}(t) = \frac{2}{\pi} \int_0^\infty ReZ_{11}(j\omega) \cos \omega t\, d\omega \quad t>0 \qquad (4)$$

$$Z_{12}(t) = \frac{1}{2\pi} \int_0^\infty Z_{12}(j\omega) e^{j\omega t} d\omega \qquad (5)$$

where $Z_{11}(t)$ is the unit current impulse response at the input 1, $Z_{12}(t)$ is the unit current impulse response at the output 2.

Evaluating these integrals, using the relationships of Equations 1, 2 and 3

$$Z_{11}(t) = 2R\left[nmf_s \frac{\sin n\pi mf_s t}{n\pi mf_s t} - (n-1)mf_s \frac{\sin \pi(n-1)mf_s t}{\pi(n-1)mf_s t}\right] \qquad (6)$$

$$Z_{12}(t) = R\left[nmf_s \frac{\sin \pi nmf_s(t-t_o)}{\pi nmf_s(t-t_o)} t>0 - (n-1)mf_s \frac{\sin \pi(n-1)mf_s(t-t_o)}{\pi(n-1)mf_s(t-t_o)}\right] \qquad (7)$$

Note that for low pass filters extending from zero to $mf_S/2$, the above expressions become:

$$Z_{11}(t) = 2mRf_s \frac{\sin \pi mf_s t}{\pi mf_s t} \qquad (8)$$

$$Z_{12}(t) = mRf_s \frac{\sin \pi mf_s(t-t_o)}{\pi mf_s(t-t_o)} \quad t>0 \qquad (9)$$

This special low pass case has been singled out for illustration because of the relative simplicity of certain waveforms as compared to the bandpass case.

Next, consider the input capacitance, $c$, of the filter at the resonant transfer frequency, $f_0$, as the sampling pulse width, $\kappa$, approaches the ideal of zero width. Since $f_0 = \frac{1}{2}\kappa$, as explained in the abovementioned copending application, $f_0$ approaches infinity as $\tau$ approaches zero.

In order to determine $c$ at a frequency approaching infinity, use will be made of the Resistance-Integral Theorem, which is:

$$\int_0^\infty ReZ_{in}(j\alpha)d\omega = \frac{\pi}{2c}$$

where $c$ is the input capacitance of the network at a frequency approaching infinity.

For the general filter with a bandwidth defined by Equation 1, this becomes:

$$\int_{\frac{2\pi(n-1)mf_s}{2}}^{\frac{2\pi nmf_s}{2}} R\, d\omega = \frac{\pi}{2c}$$

$$c = \frac{1}{2Rmf_s} \qquad (11)$$

Thus, it is evident that $c$ is independent of whether the filter is low pass or bandpass, since $n$ has disappeared from the expression.

Figure 2:
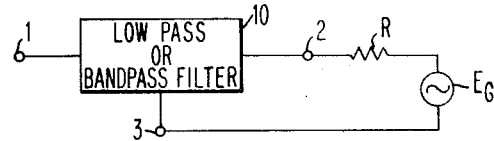

Consider, also that the ideal filter is operated in the fashion as shown in FIG. 2. When the circuit is so operated, then:

$$\frac{E_1}{E_G} = \begin{cases} e^{-j\omega t_0} & \text{within the band} \\ 0 & \text{elsewhere} \end{cases} \qquad (12)$$

where $t_0$ is the phase shift constant of the filter,
$E_1$ is the voltage at terminal 1,
$E_G$ is the generator voltage.

For FIG. 3, $m$ for the input low pass filter, M, is chosen as being one, while $m$ for the output low pass filter is chosen as being M'. Considering that Resonant Transfer between the low pass filters generates a good approximation to a weighted current Delta function, its weight may be calculated by integrating the expression for the current $i(t)$ which flows from input filter to output filter during the resonant transfer interchange; that is from time zero to time $\tau$, where $\tau$ is the time the switch 15 is closed. The expression for $i(t)$ is:

$$i(t) = \frac{E^0}{\omega_0(L+L')} \sin \omega_0 t \qquad (13)$$

where $E_0$ is the value of voltage at the output 2 of the input filter 10 at the sampling instant,
L is the resonant transfer tuning inductance of the input filter 10,
L' is the resonant transfer tuning inductance of the output filter 12.

$$\omega_0 = \sqrt{\frac{c'+c}{cc'+(L+L')}}$$

where:

$c$ and $c'$ are the input capacitances, as viewed from the switch 15, of the input and output filters respectively at the well known resonant transfer frequency of $f_0 = \frac{1}{2}\tau$, or $\omega_0 = \pi/\tau$ as defined in the above-cited application.

The expression for the weight may be calculated:

$$A = \frac{E_0}{\omega_0(L+L')} \int_0^\tau \sin \omega_0 t\, dt$$

$$A = E_0\left(\frac{2cc'}{c'+c}\right) \qquad (14)$$

By applying the result of Equation 11:

$$c = \frac{1}{2MR_Gf_s} \quad \text{and} \quad c' = \frac{1}{2M'R_Lf_s}$$

Substituting these values for C and C' into Equation 14:

$$A = E_0 \frac{1}{(R_GM+R_LM')f_s} \qquad (15)$$

Thus, the weighted current delta function may be written:

$$e_2(kT) \frac{1}{(R_GM+R_LM')f} \delta(t-kT) \qquad (16)$$

where:

T is the sampling interval and $k=0, 1, 2, 3, \ldots$ $e_2(kT)^-$ denotes the value of the voltage at the output of the input filter at an infinitesimal time before the sampling instant.

Figure 4A:
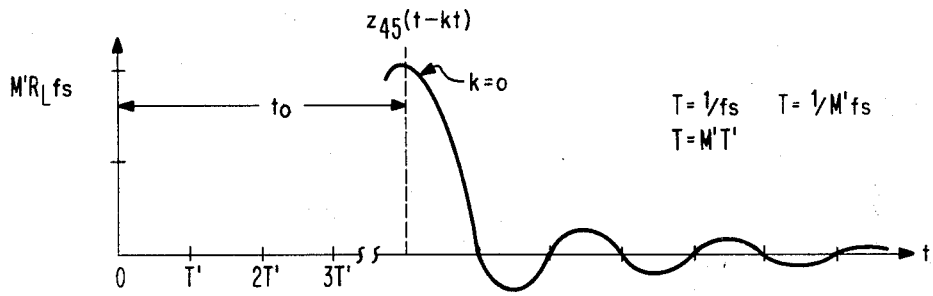

Next, examine the responses generated in the circuit due to this weighted impulse: First, consider the unit current impulse $z_{45}$. This is given by Equation 9, where $z_{12}(t)$ is replaced by $z_{45}(t)$ and $m$ by M'. A plot of $z_{45}(t-kT)$, where $T=1/f_s$, is as shown in FIG. 4a. For an impulse introduced at zero time, the center of the sin $x/x$ type function of FIG. 4a occurs at $t_0$, the filter phase shift constant. The function passes through zero at $t_0 \pm T'$, $t_0 \pm 2T'$, $t_0 \pm 3T'$, . . . , where $T'=1/M'f_s$. It also passes through zero at $t_0 \pm T$, $t_0 \pm 2T$, $t_0 \pm 3T$, . . . , since $T/T'$ equals an integral number, i.e., M'. This would be the response to $\delta(t-kT)$. The response to the weighted impulse of Equation 16 may be obtained by convolving Equation 16 with $z_{45}(t)$. The result would be:

$$e_2(kT)^- \left(\frac{1}{(R_GM+R_LM')f_s}\right)(\delta(t-kT)*z_{45}(t)) =$$

$$e_2(kT)^- \left(\frac{1}{(R_GM+R_LM')f_s}\right)(z_{45}(t-kT)) = e_5'(t)$$

(17)

where:

$e_5'$ is the voltage at point 5 due to a single impulse.

Figure 4B:
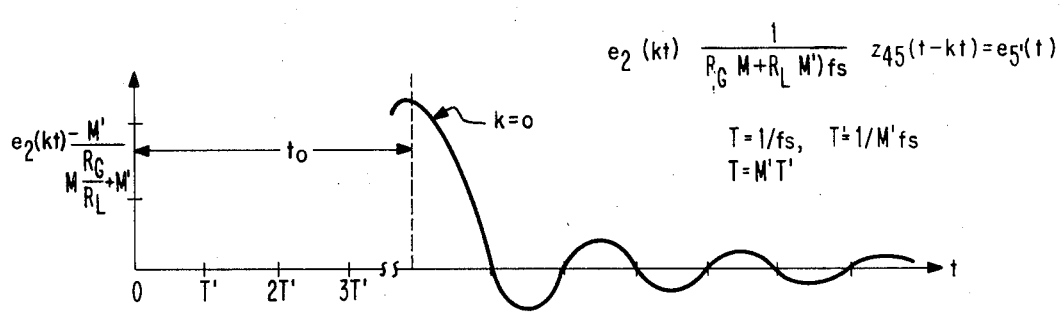

A plot of this function is shown in FIG. 4b. The maximum amplitude of the response is:

$$e_2(kT)^- \left(\frac{M'}{M\frac{R_G}{R_L}+M'}\right)$$

The superposition of the responses due to the succession of weighted impulses would be the continuous output at point 5. This may be expressed:

$$e_5(t) = \sum_k e_2(kT)^- \left(\frac{1}{(R_GM+R_LM')f_s}\right) z_{45}(t-kT)$$

(18)

The unit current impulse response $z_{44}(t)$ is given by Equation 8, with $z_{11}(t)$ replaced by $z_{44}(t)$, $m$ by $M'$, and $R$ by $R_L$ as in Equation 8a:

$$z_{44}(t) = 2M'R_Lf_s \frac{\sin \pi M'f_s t}{\pi M'f_s t} \quad t>0 \quad (8a)$$

The response due to the weighted current impulse of Equation 16 is obtained by convolving Equation 16 with $z_{44}(t)$.

$$e_2(kT)^- \left(\frac{1}{(R_GM+R_LM')f_s}\right)(\delta(t-kT)*z_{44}(t)) =$$

$$e_2(kT)^- \left(\frac{1}{(R_GM+R_LM')f_s}\right)(z_{44}(t-kT)) = e_4'(t)$$

(19)

Figure 5A:
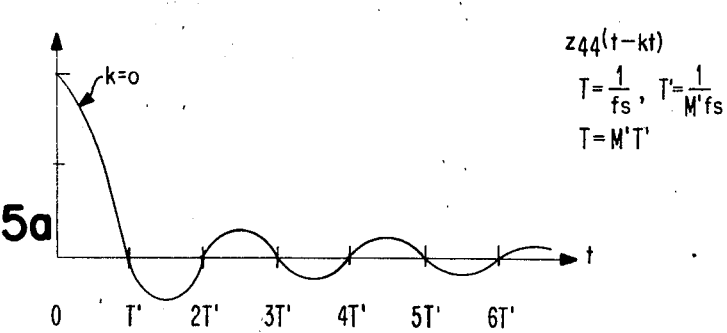
Figure 5B:
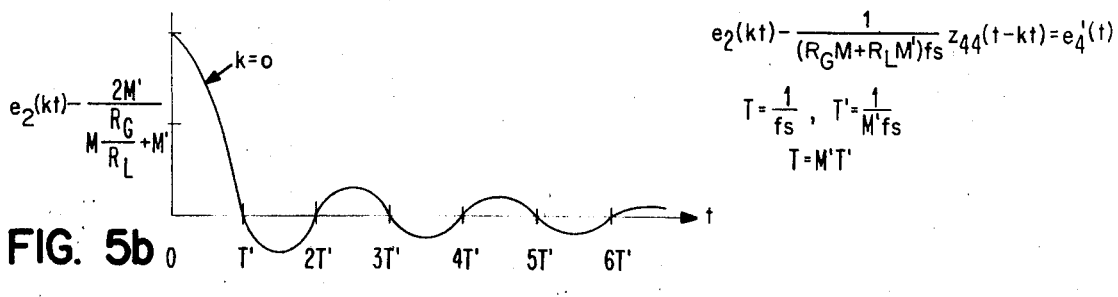

A plot of $z_{44}(t-kT)$ is shown as FIG. 5a. The function passes through zero at intervals of $T'=1/M'f_s$. It also passes through zero at intervals of $T=1/f_s$. A plot of Equation 19 is shown as FIG. 5b. The maximum amplitude of the response is:

$$e_2(kT)^- \left(\frac{2M'}{M\frac{R_G}{R_L}+M'}\right)$$

The superposition of the responses due to the succession of weighted impulses is the continuous output at point 4. This is expressed as $$e_4(t) = \sum_k e_2(kT)^- \left(\frac{1}{(R_GM+R_LM')f_s}\right)(z_{44}(t-kT))$$

(20)

Turning now to an examination of the voltage at point 2, consider the unit impulse response $z_{22}(t)$, where $z_{22}(t)$ is Equation 8 with $z_{22}(t)$ substituted for $z_{11}(t)$, M for $m$, and $R_G$ for R, as in Equation 8b.

$$z_{22}(t) = 2MR_Gf_s \frac{\sin \pi Mf_s t}{\pi Mf_s t} \quad t>0 \quad (8b)$$

Considering that when the weighted impulse of Equation 16 is applied to terminal 4 of FIG. 3, its negative is applied to terminal 2, then in order to get the response at point 2 due to the impulse of Equation 16, convolve the negative of Equation 16 with $z_{22}(t)$. That is:

$$-e_2(kT)^- \frac{1}{(R_GM+R_LM')f_s} \delta(t-kT)*z_{22}(t) =$$

$$-e_2(kT)^- \frac{1}{(R_GM+R_LM')f_s} z_{22}(t-kT) = e_2'(t)$$

(21)

Figure 6A:
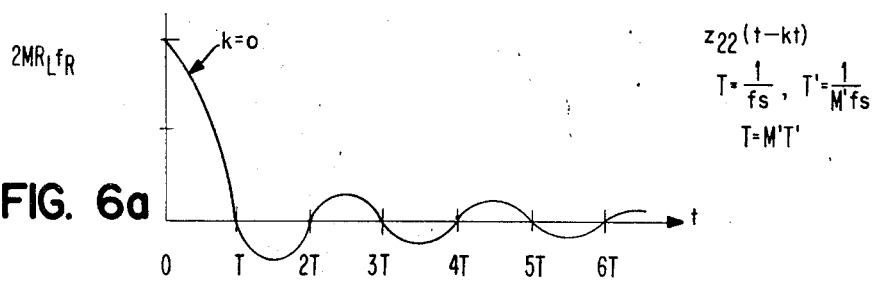
Figure 6B:
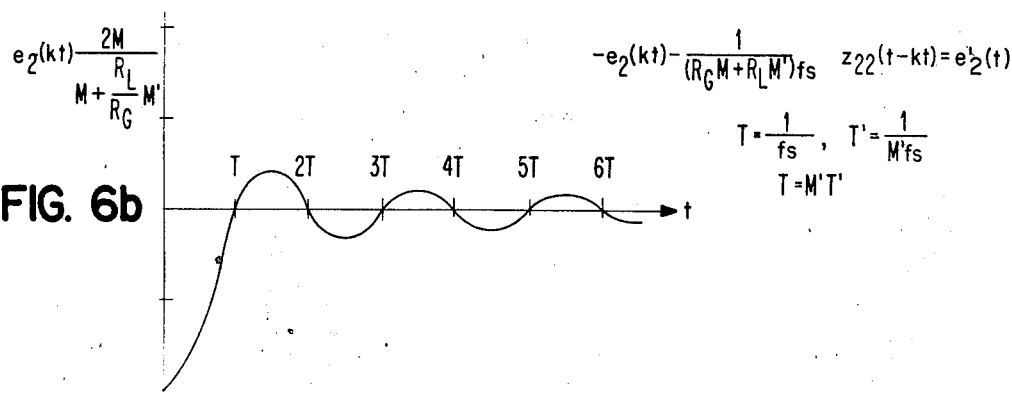

A plot of $z_{22}(t-kT)$ is shown as FIG. 6a. The function passes through zero at intervals of $T=1/f_s$. A plot of Equation 21 is shown as FIG. 6b. The maximum amplitude of the response is:

$$-e_2(kT)^- \frac{2M}{M+\frac{R_L}{R_G}M'}$$

The superposition of the responses due to the succession of weighted impulses would be the continuous voltage at point 2 due to the impulses. This is expressed as:

$$e_2''(t) = \sum_k -e_2(kT)^- \frac{1}{(R_GM+R_LM')f_s} z_{22}(t-kT)$$

(22)

Since FIG. 3 is a linear circuit $e_2''(t)$ may be superimposed with the voltage that would be coming out of the input filter 10 at point 2 if it were open circuited. Designating this open circuited voltage as $e_0(t)$, this superposition is expressed as:

$$e_2(t) = e_0(t) - \sum_k e_2(kT)^- \frac{1}{(R_GM+R_LM')f_s} z_{22}(t-kT)$$

(23)

Since $e_2''(t)$ is zero at times $(kT)^-$, or the times just before a new impulse is introduced, then $e_2(kT)^- = e_0(kT)^-$. Thus $e_2(kT)^-$ which has appeared as a multiplying factor for these various responses is merely the open circuited voltage out of the input filter 10 just before sampling instants.

Recapitulating, expressions for $e_5(t)$, $e_4(t)$, and $e_2(t)$ have been developed as Equations 18, 20, and 23 respectively. These expressions are in terms of $e_2(kT)^-$, which has been shown to be equal to $e_0(kT)^-$. It now remains to relate $e_0(kT)^-$ to the input voltage $e_G(t)$. Equation 12 serves to accomplish this function. This equation says that the open circuited output voltage of the input filter is a delayed version of the input voltage. Thus $e_0(t)$ is just a delayed version of $e_G(t)$, where the delay depends on the phase shift constant, $t_0$. Therefore, $e_0(kT)$ is the delayed input voltage at the sampling instants.

Certain overall conclusions may now be drawn regarding the operation of the circuit of FIG. 3. First consider the voltage at point 5. This voltage may be constructed from Equation 18. The details of this construction are shown in FIGS. 7a, 7b and 7c. For illustrative purposes, $M'$ is 2, M is 1, and $R_L=R_G$. Since each filter is low pass, $n$ is 1 for each. The shape of the ring off due to the successive current impulses is determined by $z_{45}(t-kT)$. The amplitude of the ring off at the sampling instants is $$e_0(kT)^- \left(\frac{M}{M\frac{R_G}{R_L}+M'}\right), \text{ which is } e_0(kT)^- \left(\frac{2}{3}\right)$$

in this case $e_0(t)$ is assumed to be a 500 c.p.s. sine wave for this illustration. The responses due to successive impulses are shown in FIG. 7a. The overall response, which the superposition of the individual responses of FIG. 7a, is shown as FIG. 7b. By considering the values of the output complex wave at the sampling points, a sampled representation of the input waveform is obtained. From these samples, the original continuous waveform may be reconstructed by application to a low pass filter. However, the continuous output wave from the output filter is a different shape from the input wave whenever $M \neq M'$. For example, for the above illustrative condition where $M=1$ and $M'=2$ the output continuous complex wave would contain an upper and a lower side band of the original base band wave.

Consider now the voltage at point 4 of FIG. 3. This voltage may be constructed in a manner similar to the above construction of the voltage at point 5. This is demonstrated in FIG. 8a and again for the case where $M=1$, $M'=2$, and $R_L=R_G$. $z_{44}(t-kT)$ determines the shape of the responses due to current impulses at the sampling times. The amplitude of each response at these times is:

$$e_0(kT) - \left[\frac{2M'}{M\frac{R_G}{R_L} + M'}\right] \text{ or } e_0(kT) - \left(\frac{4}{3}\right)$$

for our example. The superposition of the several responses is the voltage waveform at point 4 of FIG. 3. The entire construction is shown in one diagram, that of FIG. 8a, instead of two as was done for the waveform at point 5 in FIGS. 7a and 7b. Note that at the time each impulse is inserted the effects of the previous impulses are zero. Thus, the voltage at these times represents the amplitude of the input voltage times 4/3. Since the impulses are inserted only when the voltage at point 4 is zero, the closure of the sampling switch at these times ideally cannot upset the ring off voltages generated as a function of earlier pulses.

Finally, consider the voltage at point 2 of FIG. 8. The construction details are shown in FIGS. 8b and 8c. $e_2''(t)$ is obtained in a manner similar to the determination of $e_4(t)$. In this case, the ring off shape due to individual pulses is determined by $z_{22}(t-kT)$. The amplitude of the individual responses at the sampling instants is:

$$-e_0(kT) - \left(\frac{2M}{M + \frac{R_L}{R_G}M'}\right), \text{ or } -e_0(kT) - \left(\frac{2}{3}\right)$$

The superposition of these individual responses is $e_2''(t)$. This is shown in FIG. 8b. To get the overall voltage waveform at point 2, one more superposition must be performed. That is, $e_2''(t)$ must be superimposed with $e_0(t)$. This process is shown in FIG. 8c. Note that at the sampling instants $e_2(t)$ drops from $$e_0(t) \text{ by } e_0(kT) - \left(\frac{2M}{M + \frac{R_L}{R_G}M'}\right)$$

and rises back to the level of $e_0(t)$ at the next sampling time.

It is of interest to note that the ratio of the amount by which $e_4(t)$ rises at the sampling instant to the amount by which $e_2(t)$ drops at the sampling instant is:

$$\frac{e_0(kT) - \left(\frac{2M'}{M\frac{R_G}{R_L} + M'}\right)}{-e_0(kT) - \left(\frac{2M}{M + \frac{R_L}{R_G}M'}\right)} = \frac{M'R_L}{-MR_G} = \frac{V'}{V} \quad (24)$$

where:

$V'/V$ is the ratio of output voltage to input voltage. Here $V'=2V$. This is the result to be expected, since by Equation 11:

$$c = \frac{1}{2MR_G f_s} \text{ and } c' = \frac{1}{2M'R_L f_s}$$

and $$V = \frac{q}{c} \text{ and } V' = \frac{-q}{c'}$$

where:

$q$ and $q'$ are the charges on the capacitances of the input and output filters, respectively. Thus:

$$\frac{V'}{V} = \frac{-c}{c'} = -\frac{\frac{1}{2MR_G f_s}}{\frac{1}{2M'R_L f_s}} = \frac{-M'R_L}{MR_G} \quad (24a)$$

The above constitutes a reasonably rigorous explanation of the theory underlying the operation of the circuit of FIG. 3. Thus far, the discussion has been specifically limited to transmission between low pass filters. Thus, it remains to comment on the more general bandpass case. In the circuit of FIG. 3, the input and output filters 10 and 12 may be either low pass or bandpass. The reason that only the low pass situation has been specifically considered is that the basic waveforms involve only a sin $x/x$ type function, and hence are relatively easy to plot. When either or both of the filters become bandpass the waveforms are considerably more complex; however, certain salient points can be noted that will allow significant conclusions to be drawn.

The two primary governing equations are (6) and (7). For the low pass to low pass circuit these equations reduce to (8) and (9), which have been used to construct the various waveforms. The low pass forms result from letting $n=1$. Whenever $n=1$, then Equations 6 and 7 govern the operation. Consider first the waveforms at point 5 of FIG. 3 in terms of 7. Here $z_{45}(t-kT)$ is the controlling function. This is obtained by replacing $z_{12}(t)$ by $z_{45}(t)$, $m$ by $M'$, $n$ by $N'$, and $R$ by $R_L$ in Equation 7, as seen in Equation 7a.

$$z_{45}(t-Kt) = R_L \left[ N'M'f_s \frac{\sin \pi N'M'f_s(t-t_0)}{\pi N'M'f_s(t-t_0)} \right.$$
$$\left. - (N'-1)M'f_s \frac{\sin \pi(N'-1)M'f_s(t-t_0)}{\pi(N'-1)M'f_s(t-t_0)} \right] \quad (7a)$$

By a detailed consideration of Equation 7a, it may be seen that for any combination of $M'$ and $N'$, each chosen as integral numbers, $z_{45}(t-kT)$ will pass through zero at $$t_0 \pm \frac{1}{M'f_s}, \; t_0 \pm \frac{2}{M'f_s}, \; t_0 \pm \frac{3}{M'f_s}, \; \cdots$$

This is illustrated in FIGS. 7a and 7b for a low pass output filter. In addition, it may be noted that the weight of the current impulse, Equation 14, may be expressed in terms of $c$ and $c'$, which from Equation 11 can be seen to be independent of whether the filter is low pass or bandpass. Thus, the weight as expressed in Equation 15 is independent of whether or not the filter is low pass or bandpass. Since this weight appears as the multiplying factor in the expression for $e_5(t)$, Equation 18, the amplitude of the output waveform at the sampling time at point 5 is the same for both $n=1$ and $n>1$. Thus, it may be said that zeros always occur at these same points and the amplitude of $e_5(t)$ at the sampling points are the same for both a low pass and a bandpass output filter.

The operation of the circuit of FIG. 3 for the more general bandpass can be better understood by examining the waveform at point 4. Here, Equation 6 becomes the governing equation. By following the same line of reasoning as for point 5 above, it can be deduced that $e_4(t)$ will pass through common zeros for both the low pass and bandpass cases and that these common points will be $$\frac{1}{M'f_s}, \; \frac{2}{M'f_s}, \; \frac{3}{M'f_s}, \; \cdots$$

The fact that these zeros are so distributed guarantees the required initial condition for the output filter. That is, that the input voltage to the output filter 12 shall be passing through zero at the instant just before the sampling switch closes. This distribution of zeros also makes it possible to use the basic configuration of FIG. 3 as a building block to construct time division systems, as will be made evident in subsequent portions of this application. Also, the amplitude of the response at the sampling instant will be the same in both cases.

Considering the waveform at point 2, the same kind of reasoning will show that the amount that $e_2(t)$ will drop at the sampling instant is governed by the same expression for both cases, and that at intervals of $1/Mf_s$ it will recover to $e_o(t)$ in both cases. In this instance, it is the distribution of these zeros that guarantees the proper initial conditions for the input filter 10. That is, that the output voltage of the input filter 10 shall be at the level of a delayed version of the input signal at the instant just before the sampling switch closes.

An important point that remains to be mentioned is the required condition for lossless transmission by the resonant transfer process of FIG. 3. It turns out that this condition is that $c=c'$. By Equation 11, this equality may be stated:

$$\frac{1}{2MR_Gf_s} = \frac{1}{2M'R_Lf_s}$$

$$MR_G = M'R_L \quad (25)$$

By applying this condition to Equations 24 or 24a, it may be seen that $V' = -V$ for lossless transmission. That is, the voltage appearing across $c$ is completely transferred to $c'$. Note that this condition for lossless transmission is not the case that has been illustrated throughout the above example. That is, it has been assumed that $M=1$, $M'=2$, and $R_G=R_L$, so that $MR_G \neq M'R_L$. This condition has been used for illustrative purposes in order to make the discussion more general. The case where $MR_G = M'R_L$ can be considered to be a special case. For the case of transmission between filters of unequal bandwidth the impedances $R_G$ and $R_L$ can be adjusted to compensate for the fact that $M \neq M'$ and thereby achieve lossless transmission.

To complete this explanation of the theory behind the operation of the circuit of FIG. 3, one more relationship is of importance. This is a statement for the resonant transfer current pulse in terms of the impedance levels and bandwidths of the input and output filters, or in terms of M, M', $R_G$ and $R_L$. This may be derived from Equation 13 by substituting in values for $c$ and $c'$ based on Equation 11. The result is:

$$i(t) = E_0 \frac{\pi}{2\tau} \frac{1}{(R_GM + R_LM')} f_s \sin \omega_0 t$$

It is useful to compile in summary form certain of the more important results that have been developed in this analysis. Such a compilation is shown in Table 1.

(b) The condition required for lossless transmission is $MR_G = M'R_L$.

(c) $i(t) = e_0(kT) - \frac{\pi}{2\tau} \frac{1}{(R_GM + R_LM')f_s} \sin \omega_0 t$

RESONANT TRANSFER CIRCUIT

Figure 10:
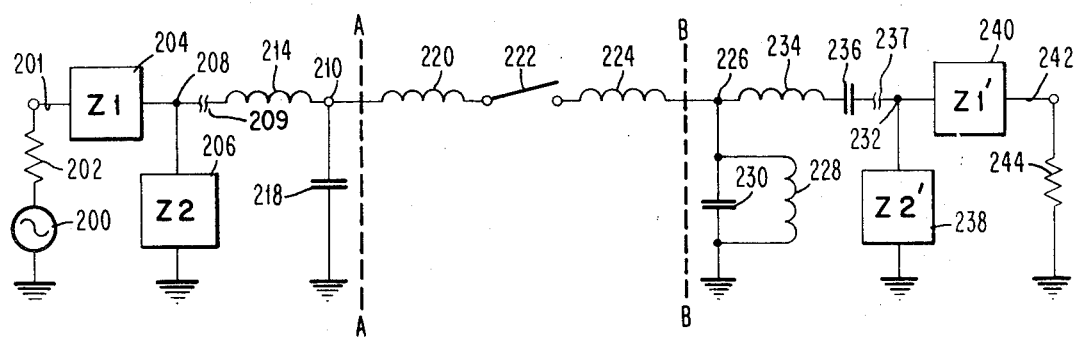
FIG. 10 shows a circuit diagram of an embodiment of the present invention.

FIG. 10 of the drawing shows an embodiment of the resonant transfer circuit of this invention connecting an input low pass filter to an output bandpass filter each of a different bandwidth. A source of information signls 200 having generator impedance 202 supplies an information signal voltage through line 201 to impedance 204. Connected to impedance 204 is a second impedance 206 shunted to ground; impedances 204 and 206 would be part of the input low pass filter. Other impedances may be added to tailor the filtering characteristics of the circuit—as shown by the break at 209. Impedances 204 and 206 are both connected to terminal 208. Connected in series between terminal 208 and terminal 210 is inductor 214. A first energy storage circuit comprising capacitor 218 is also connected to terminal 210. Inductor 220 extends between terminal 210 and switch means 222. Switch means 222 is normally open.

With continued reference to FIG. 10, inductor 224 is connected on the opposite side of switch means 222 and is tied to terminal 226. A second energy storage circuit, comprising capacitor 228 and inductor 230 also joins terminal 226. Connected in series between terminal 226 and terminal 232 are inductor 234 and capacitor 236. Joined also to terminal 232 are impedances 238 and 240. Additional impedances may be added here to tailor the filtering characteristics—as shown by break 237. Running from impedance 240 is an outgoing line 242 having a load impedance 244.

Thus, with further reference to FIG. 10, those components to the left of dashed line A—A comprise an input low pass filter. Similarly, those components to the right of dashed line B—B comprise an output bandpass filter. Switch means 222 when closed enables an incoming information signal to be transferred ideally without energy loss from an input low pass filter to an output bandpass filter as explained in detail in the above-mentioned application. In general, the transfer of energy may be between bandpass filters, where the low pass filter is considered to be a special case of a bandpass filter.

Impedances 204, 206, inductors 214 and capacitors 218 comprise an input low pass filter; their values depend upon the frequencies to be passed. The principles of filter design are well known in the art and will not be further expounded here. In like manner, impedances 238, 240, inductors 234, 228, and capacitors 236, and 230 comprise an output bandpass filter and their particular values

TABLE 1.—IMPORTANT RELATIONSHIPS FOR GENERALIZED RESONANT TRANSFER

| | | |
|---|---|---|
| (a) Output voltage of output filter. | $t_0 \pm \frac{1}{M'f_s}, t_0 \pm \frac{2}{M'f_s},$ $t_0 \pm \frac{3}{M'f_s}, \ldots, t_0 \pm \frac{M'-1}{M'f_s}$ | $e_0(kT) - \left(\frac{M'}{MR_G/R_L + M'}\right)$ |
| (b) Input voltage of output filter. | $\frac{1}{M'f_s}, \frac{2}{M'f_s}, \frac{3}{M'f_s},$ $\ldots \frac{M'-1}{M'f_s}$ | From zero to $e_0(kT) - \left(\frac{2M'}{MR_G/R_L + M'}\right)$ |
| (c) Output voltage of input filter. | Zeros occur only when $MR_G = M'R_L;$ then at $\frac{1}{Mf_s}, \frac{2}{Mf_s}, \frac{3}{Mf_s},$ $\ldots, \frac{M-1}{Mf_s}$ | From $e_0(kT) -$ to $e_0(kT) -$ $-e_0(kT) - \left(\frac{2M}{M + (R_L/R_G)M'}\right)$ |

NOTES (a) The filter must be constructed in accord with this definition $W = mf_s/2$; high edge of filter $= nmf_s/2$, where $n$ and $m$ are integral positive numbers.

are designed in accordance with the frequencies to be passed by them; their values for a particular application may also be determined by utilizing well-known principles of filter design. Further, the general well known conditions for resonant transfer, as disclosed in the above-identified application have been assumed.

In order to achieve resonant transfer between these filters of unequal bandwidths the hardware component values of each filter are chosen such that each bandwidth is an integral half multiple of the sampling frequency and the high edge of each pass band is an integral multiple of its bandwith. For example, assuming a sampling frequency of 8000 c.p.s., the input filter has a band width of 4 kc. and a pass band of 0–4 kc. The output filter has a bandwidth of 8 kc. and a pass band from 8 kc.–16 kc. The manner of choosing the hardware component values to set the frequency bandwidth and high edge of the band of the filters is well known and is also explained in detail in the above-identified application. It is to be emphasized that the foregoing example is but one illustration of an embodiment of this invention. It is evident that other bandwidths can be chosen. Though the example has been directed to the case of an input low pass filter and to an output bandpass filter, the situation could just as easily be low pass filter to low pass filter, or bandpass filter to low pass filter, or bandpass filter to bandpass filter.

TIME DIVISION MULTIPLEX COMMUNICATION SYSTEM

Figure 11:
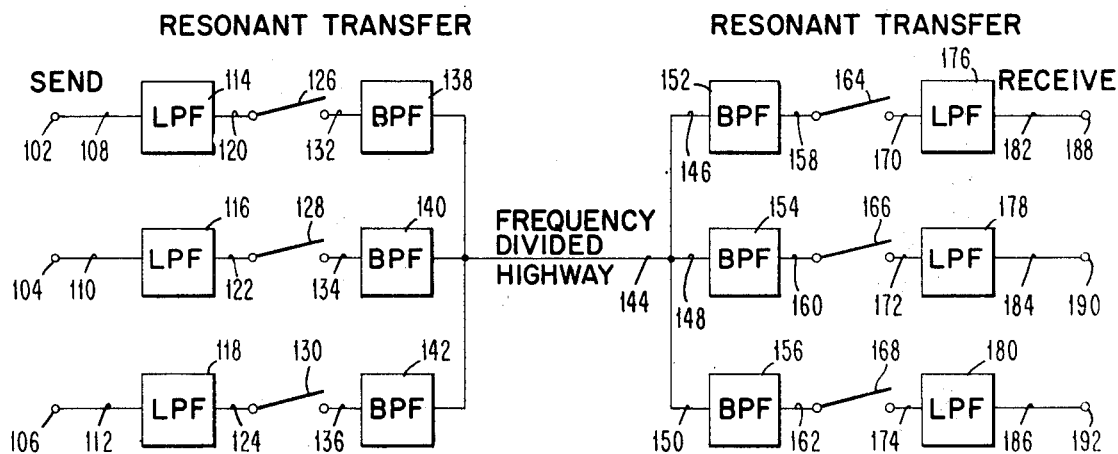
FIG. 11 shows the system diagram of a prior art single sideband frequency division multiplexed resonant transfer voice communication system.

The prior art limitation of resonant transfer between filters of equal bandwidth has limited previous single sideband resonant transfer communication systems to the frequency multiplexed type seen in FIG. 11. This consists of a number "SEND" channels on the left transmitting to a number of "RECEIVE" channels on the right. For the purposes of this illustration, only a simple one way system is illustrated.

Two central bandpass filters, separated by the frequency divided highway, are shown for each channel. After band limiting by filters 114, 116, 118, each "SEND" channel 120, 122, 124 is sampled at a rate of $f_s$ by switches 126, 128, 130, respectively. This produces a periodic spectrum along the frequency axis. The respective bandpass filters 138, 140, 142 pick out the appropriate upper or lower sidebands as a function of their placement in the spectrum. The outputs from these filters are fed into a common line to produce the frequency divided highway 144. Resonant transfer is incorporated between each filter pair 114–138, 116–140, 118–142.

At the receiving end, a matching set of bandpass filters 152, 154, 156 extract the various channels from the broadband line. The output from each of these filters is sampled at frequency $f_s$ by switches 164, 166, 168, respectively. Again the periodic spectrum is produced and the low frequency components are recovered by low pass filters 176, 178, 180. Resonant transfer is also incorporated between each filter pair 152–176, 154–178, 156–180, respectively.

The above discussed impulse ring off characteristics of the filters accounts for the fact that the circuit of this invention may be operated in a time division mode, thus allowing implementation of a resonant transfer time division communication system as an improvement over prior art systems. When the component values of the filters of FIG. 10 have been chosen as explained above, the voltage wave out of the output filter at sampling intervals along the time axis of $1/f_s = T$ will have its amplitude dependent on the factor:

$$\frac{M}{M\frac{R_G}{R_L}+M'}$$

where:

M and M are the values of $m$ for the output and input filter, respectively. This amplitude will be $$\frac{M}{M\frac{R_G}{R_L}+M'}$$

multiplied by the level of a delayed version of the input filter. This is seen in FIG. 7b. Zeros will occur in the output voltage waveform at intervals along the time axis of $1/M'f_s$, but not at the sampling points T, 2T, 3T, . . . . At the input 4 of the output filter 12, the voltage at the sampling points will rise from zero to:

$$\frac{2M'}{M\frac{R_G}{R_L}+M'}$$

multiplied by the level of a delayed version of the input signal. This is seen in FIG. 8a. Zeros will occur at intervals of $1/M'f_s$, but not at the sampling points T, 2T, 3T, . . . . At the output 2 of the input filter 10 at the sampling instants, the voltage will drop from the level of a delayed version of the input signal by an amount equal to the level of the delayed input signal multiplied by:

$$\frac{2M}{M\frac{R_L}{R_G}+M'}$$

as seen in FIG. 8c. In the time $1/Mf_s$ this voltage will again be at the level of a delayed version of the input signal. Note that this is summarized in Table 1.

DESCRIPTION OF TIME DIVISION MULTIPLEXING CIRCUIT

Figure 9:
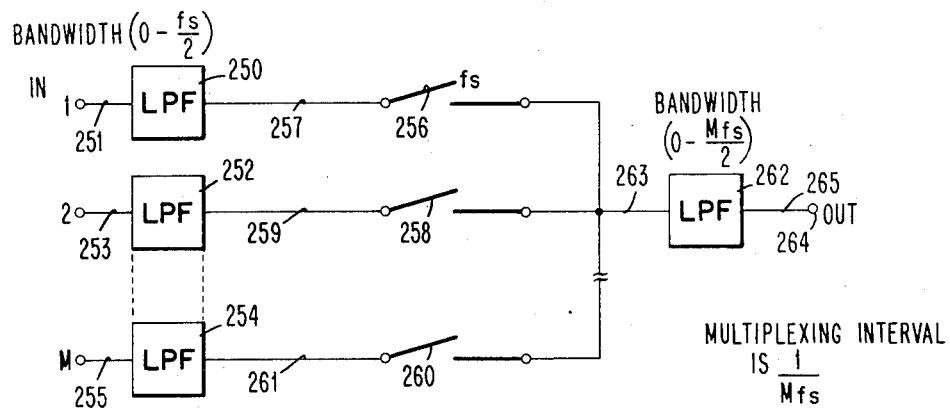
FIG. 9 shows an illustration of time division multiplexing of several input filters into a single wideband filter.

A time division scheme of operation is seen in FIG. 9. In this configuration, input channels 251, 253, 255 are connected to low pass filters 250, 252, 254, respectively. Each filter is connected to one terminal of a respective sampling switch 256, 258, 260. The other terminal of each switch is connected to the input 263 of the wideband low pass filter 262. For this example, the value of $m$ for each input filter 250, 252, 254 is chosen to be one. The value of $m$ for the output low pass filter 262 is chosen to be M, the number of input channels. The value of generator resistance for the signal into each input filter 250, 252, 254 is $R_G$ and the load resistance of output filter 262 is $R_L$. For the combination of each input filter 250, 252, 254, and the output filter 262, Equation 3 must be satisfied.

OPERATION OF TIME DIVISION MULTIPLEXING CIRCUIT

Consider the signal flow from input to output for the circuit of FIG. 9. The filters 250, 252, 254 are sampled in a sequential fashion with a multiplexing interval of $1/Mf_s = T$. At the output 257 of the input low pass filter 250 at the sampling times the voltage will drop by an amount dependent on the factor:

$$\frac{2}{M\frac{R_L}{R_G}+1}$$

In the time $1/f_s$, it will return to the level of incoming signal from the low pass filter 250. Thus, during the time $1/f_s$, every filter is sampled, and sampled at a time when it has returned to the level of the incoming signal. At the input 263 of the output filter 262 at the sampling instants the voltage will rise from zero by an amount dependent on the factor:

$$\frac{2M}{M+\frac{R_G}{R_L}}$$

In between these sampling instants this voltage will pass through zeros at intervals of $1/Mf_s$. However, at these zero points samples from other channels are introduced. Thus, at increments along the time axis of $1/Mf_s$ sampled representations of the input signals for the various channels appear. Each channel sample is independent of the information on the other channels. In the same manner, at intervals of $1/Mf_s$ representations of the input signals for the various channels appear at the output 265 of the output filter 262. At any one sampling point only one channel is represented. However, in between the sampling points the effects of all the channels are superimposed. The amplitude to which this output voltage rises at the sampling point for a given channel is determined by the factor:

$$\frac{M}{M+\frac{R_G}{R_L}}$$

By time multiplexing the output voltage of the output filter, each channel may be separated out from the others. Though low pass filters have been shown in FIG. 11, note that according to the above explanation, any of the filters could just as well have been the bandpass type.

DESCRIPTION OF TIME DIVISION MULTIPLEXING COMMUNICATION SYSTEM

Figure 12:
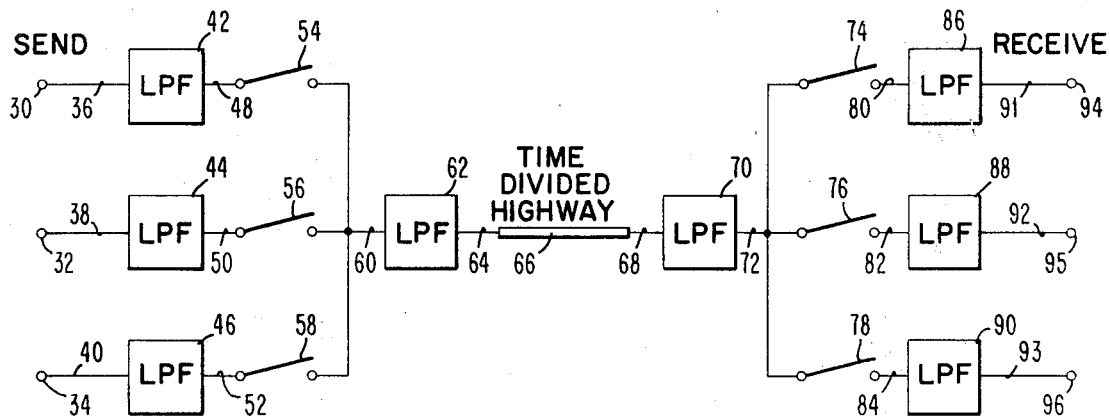
FIG. 12 shows one embodiment of the resonant transfer time division multiplexed voice communication system of this invention utilizing filters of unequal bandwidth.

The ability to effect ideally lossless time multiplexed resonant transfer of signals between several input filters and a single wideband output filter, as described in connection with FIG. 9, allows the implementation of a complete time division multiplex communication system having ideally lossless resonant transfer between filters. One such communication system is seen in FIG. 12. M input channels 36, 38, 40 enter on the "SEND" side. Channels 36, 38, 40 are connected to band limitation filters 42, 44, 46 respectively. Each filter 42, 44, 46 is a low pass filter having a pass band of zero to $f_s/2$. The output 48, 50, 52, of each filter is connected to one terminal of sampling switch 54, 56, 58, respectively. The other terminals of each switch are connected to input terminal 60 of wideband low pass filter 62. Low pass filter 62 is a wideband filter having a load resistance $R_L$ and a bandwidth from zero to $Mf_s/2$. Resonant transfer is incorporated between each input low pass filter and the wideband filter 62. Note that the wideband low pass filter or the input low pass filters could just as well be of the bandpass type, as long as the limitations of Equation 1 are obeyed for the combination of each filter 42, 44, 46 and filter 62. $m$ for filters 42, 44, 46 is chosen to be one, while $m$ for filter 62 is chosen to be M.

The output 6 of low pass filter 62 is connected via time divided highway 66 to the "RECEIVE" side of the system. This time divided highway is connected to the input 68 of low pass wideband filter 70. The source resistance of signals entering filter 70 is the $R_L$ of filter 62; however, in order to apply the formulas of Table 1 to the "RECEIVE" side, the $R_L$ of filter 62 must be considered as the $R_G$ of filter 70. The output 72 of low pass filter 70 is connected to one side of each of the sampling switches 74, 76, 78. The other terminal of said sampling switches are connected respectively to the inputs 80, 82, 84, respectively, of low pass filters 86, 88, 90. Each filter 86, 88, 90 has its load resistance $R_L$, which is equal to the original $R_G$ on the "SEND" side. As with the "SEND" side, low pass wideband filter 70 has a bandpass of zero to $Mf_s/2$ and low pass filters 86, 88, 90 have pass bands from zero to $f_s/2$ and Equation 3 is satisfied for the combination of each filter 86, 88, 90 and filter 70. M for filter 70 is chosen to be M, while $m$ for filters 86, 88, 90 is chosen to be one.

OPERATION OF TIME DIVISION MULTIPLEXING COMMUNICATION SYSTEM

In operation, M time multiplexed input signals enter the system, one for each channel 36, 38, 40. The source of each signal (not shown) has a resistance $R_G$. Each channel signal is band limited by its respective low pass filter 42, 44, 46. Each channel is then sampled by its respective sampling switch 54, 56, 58 at a rate of $f_s$. The sampling of each individual channel is time multiplexed. That is, each channel is sampled at a rate $f_s$ and the multiplexing interval between channel is $1/Mf_s$. Resonant transfer is thus incorporated between each input low pass filter 42, 44, 46 and the wideband filter 62. This represents the case of resonant transfer between filters of unequal bandwidth. The voltage ring off effects at the sampling instant of a sample from any one channel 36, 38, 40 into the wideband filter 62 are independent of all samples from the other lines. This holds true both at the input 60 and the output 64 of the wideband filter 62. This follows since, as has been shown, the ring off due to samples from other lines at this time is always passing through zero. The amplitude of the voltage wave at the output 64 at a given sampling point would be $$M/(R_G/R_L+M)$$

times the input amplitude for a particular channel, where $R_G$ is the resistance of the input signal source for a single channel 36, 38, 40 and $R_L$ is the load resistance of wideband filter 62.

The continuous signal at the output 64 of wideband filter 62, formed by the ring off of the time multiplexed stream of pulses at the input 60 is band limited to $Mf_s/2$ and transmitted over time divided highway 66 to the input 68 of wideband low pass filter 70 of the "RECEIVE" side of the system. Note that this continuous time divided signal could very well be sampled and transmitted in digital form and converted back to time divided analog form at the "RECEIVE" side. The signal at output 72 of wideband filter 70 is then sampled at a rate $f_s$ by sampling switches 74, 76, 78. The multiplexing interval is $1/Mf_s$. Resonant transfer is thus incorporated between filter 70 and each filter 86, 88, 90. Again this represents resonant transfer between filters of unequal bandwidth. As has been shown, the samples that ringoff into any channel low pass filter 86, 88, 90 are independent of the effects of all other channels at a given sampling time, since the other channel ring off are all passing through zero at this time. Hence, the signal amplitude for a particular channel at the sampling instant is:

$$\frac{1}{1+\frac{R_L}{R_G}M}$$

times the input voltage, as indicated above. The amplitude at the sampling time at the output 91, 92, 93 of a given low pass filter 86, 88, 90, respectively, would be $(M/(R_G/R_L+M)(1/(MR_L/R_G+1))$ times the level of the input voltage. If $R_G$ and $R_L$ are adjusted in accord with the general criterion for lossless transmission, $MR_G=M'R_L$, then:

"SEND" Side $R_G=MR_L$ and $$\frac{M}{\frac{R_G}{R_L}+M}=\frac{M}{M+M}=\frac{1}{2}$$

"RECEIVE" Side $MR_L=R_G$ $$\frac{1}{M\frac{R_L}{R_G}+1}=\frac{1}{1+1}=\frac{1}{2}$$

Under these conditions the factor $(M/(R_G/R_L+M)(1/(MR_L/R_G+1))$ becomes $(½)(½)$. Thus, the level of the output voltage at a given filter output 91, 92, 93 is ¼ that of the input. This corresponds to lossless transmission; that is, the filters and switches ideally to contribute no loss.

While the invention has been particularly shown and described with reference to preferred embodiments thereof, it will be understood by those skilled in the art that various changes in form and details may be made therein without departing from the spirit and scope of the invention.

We claim:
1. A resonant transfer circuit for transferring energy from a first filter to a second filter of different bandwidth comprising in combination:
input signal generating means having resistance $R_G$;
first filter means having bandwidth $Mf_s/2$ and a pass band whose high edge is $NMf_s/2$, wherein
$f_s$ is a frequency of oscillation
M and N are positive integral numbers
and wherein $M(2N-1)/4$ is not an integral value when said first filter means has a bandwidth identical to twice the bandwidth of the input information signal being transmitted, said first filter means comprising a first energy storage means for transitorily storing said signals;
second filter means having a bandwidth $M'f_s/2$, different from the bandwidth of said first filter means, and a pass band whose high edge is $N'M'f_s/2$ wherein
$f_s$ is said frequency of oscillation
M' and N' are positive integral numbers
and wherein $M'(2N'-1)/4$ is not an integral value when said second filter means has a bandwidth identical to twice the bandwidth of the input information signal being transmitted, said second filter means comprising a second energy storage means for transitorily storing said signals, and having a load resistance $R_L$; and
sampling switch means periodically operated at the rate of said frequency $f_s$ for transferring said signals stored by said first energy storage means to said second energy storage means.

2. The resonant transfer circuit of claim 1 wherein said first filter means is a low pass filter and said second filter means is a low pass filter.

3. The resonant transfer circuit of claim 1 wherein said first filter means is a low pass filter and said second filter means is a bandpass filter.

4. The resonant transfer circuit of claim 1 wherein said first filter means is a bandpass filter and said second filter means is a low pass filter.

5. The resonant transfer circuit of claim 1 wherein said first filter means is a bandpass filter and said second filter means is a bandpass filter.

6. The resonant transfer circuit of claim 1 wherein the component values $R_G$ and $R_L$ are chosen such that their ratio is a ratio of integral numbers.

7. The resonant transfer circuit of claim 6 wherein said first filter means is a low pass filter and said second filter means is a low pass filter.

8. The resonant transfer circuit of claim 6 wherein said first filter means is a low pass filter and said second filter means is a bandpass filter.

9. The resonant transfer circuit of claim 6 wherein said first filter means is a bandpass filter and said second filter means is a low pass filter.

10. The resonant transfer circuit of claim 6 wherein said first filter means is a bandpass filter and said second filter means is a bandpass filter.

11. A resonant transfer time division multiplexing circuit comprising, in combination:
a plurality of input signal generating means having resistance $R_G$;
a plurality of filters each accepting one of said input signals and having a bandwidth $Mf_s/2$ and a pass band whose high edge is $NMf_s/2$ wherein
$f_s$ is a frequency of oscillation
M and N are positive integral numbers
and wherein $M'(2N'-1)/4$ is not an integral value whenever any of said plurality of filters has a bandwidth identical to twice the bandwidth of the input information signal being transmitted;
a single wideband filter of different bandwidth from each of said plurality of filters, said wideband filter having a load resistance $R_L$, a bandwidth $M'f_s/2$ and a pass band whose high edge is $N'M'f_s/2$ wherein
$f_s$ is said frequency of oscillation
M' and N' are positive integral numbers
and wherein $M'(2N'-1)/4$ is not an integral value when said single wideband filter has a bandwidth identical to twice the bandwidth of the input information signal being transmitted, and a plurality of sampling means periodically obtaining a sample of said accepted signal from each of said plurality of fibers and presenting said sample to said wideband filter at a rate $f_s$ with a multiplexing interval of $1/Mf_s$.

12. The resonant transfer time division multiplexing circuit of claim 11 wherein the values of the components $R_G$ and $R_L$ are chosen such that their ratio is a ratio of integral numbers.

13. The resonant transfer time division multiplexing circuit of claim 11 wherein said single wideband filter is a bandpass filter.

14. The resonant transfer time division multiplexing circuit of claim 11 wherein said single wideband filter is a low pass filter.

15. An ideally lossless resonant transfer time division multiplex communication system comprising, in combination:
means for generating a plurality of input signals, each generating means having resistance $R_G$;
a first plurality of filters, each of said filters having an input terminal, each accepting an input signal from one of said generating means, an energy storage circuit for transistorily storing said signals, an output terminal, a bandwidth $Mf_s/2$ and a pass band whose high edge is $NMf_s/2$ wherein
$f_s$ is a frequency of oscillation
M and N are positive integral numbers
and wherein $M(2N-1)/4$ is not an integral value when any of said first plurality of filters has a bandwidth identical to twice the bandwidth of the input information signal being transmitted;
a plurality of sampling switches equal in number to said first plurality of filters, each of said switches having an input terminal and an output terminal, the input terminal of a given switch being connected to the output terminal of a respective one of said first plurality of filters, and the output terminal of each switch connected to a first single terminal;
a first wideband filter having an input terminal, an energy storage circuit for transitorily storing said information signals, an output terminal, a load resistance $R_L$, a bandwidth $M'f_s/2$ and a pass band whose high edge is $N'M'f_s/2$ wherein
$f_s$ is said frequency of oscillation
M' and N' are positive integral numbers
and wherein $M'(2N'-1)/4$ is not an integral value when said first wideband filter has a bandwidth identical to twice the bandwidth of the input information signal being transmitted, said input terminal being connected to said first single terminal;
a second wideband filter having an input terminal, an energy storage circuit for transitorily storing signals whose source resistance, $R_G$, is the $R_L$ of said first wideband filter, an output terminal, a bandwidth $M'f_s/2$ and a pass band whose high edge is $N'M'f_s/2$ wherein
$f_s$ is said frequency of oscillation
M' and N' are positive integral numbers
wherein $M'(2N'-1)/4$ is not an integral value when said second wideband filter has a bandwidth identical to twice the bandwidth of the input information signal being transmitted;

a time divided highway connecting said output terminal of said first wideband filter and said input terminal of said second wideband filter, said output terminal of said second wideband filter being connected to a second single terminal;

a plurality of sampling switches each having an input terminal and an output terminal, said input terminals being connected to said second single terminal;

a second plurality of filters, each having an input terminal, an energy storage circuit for transitorily storing signals, an output terminal, a bandwidth $Mf_s/2$ and a pass band whose high edge is $NMf_s/2$ wherein $f_s$ is said frequency of oscillation M and N are positive integral numbers and wherein $M(2N-1)/4$ is not an integral value when any of said second plurality of filters has a bandwidth identical to twice the bandwidth of the input information signal being transmitted, said input terminal of each of said second plurality of filters connected to the output terminal of a respective one of said second plurality of sampling switches.

16. The ideally lossless resonant transfer time division multiplex communication system of claim 15 wherein the values of components $R_G$ and $R_L$ are chosen such that their ratio is a ratio of integral numbers.

17. The ideally lossless resonant transfer time division multiplex communication system of claim 15 wherein said first plurality of filters is sampled by said first plurality of sampling switches at a frequency $f_s$, with a multiplexing interval of $1/Mf_s$.

18. The ideally lossless resonant transfer time division multiplexing communication system of claim 15 wherein said second plurality of sampling switches are operated at a frequency $f_s$ with a multiplexing interval of $1/Mf_s$.

19. The ideally lossless resonant transfer time division multiplexing communication system of claim 15 wherein both said first and said second wideband filters are bandpass filters.

20. The ideally lossless resonant transfer time division multiplexing communication of claim 15 wherein both said first and said second wideband filters are low pass filters.

References Cited

UNITED STATES PATENTS

| | | | |
|---|---|---|---|
| 3,238,305 | 3/1966 | Bergmann et al. | 179—15 |
| 3,205,310 | 9/1965 | Schlichte | 179—15 |
| 3,325,735 | 6/1967 | Fettweis | 179—15 |

RALPH D. BLAKESLEE, Primary Examiner

UNITED STATES PATENT OFFICE
CERTIFICATE OF CORRECTION

Patent No. 3,520,998　　　　　　　　　Dated July 21, 1970

Inventor(s)　　Paul M. Thrasher et al.

It is certified that error appears in the above-identified patent and that said Letters Patent are hereby corrected as shown below:

Column 5, line 12 should read $$-- Z_{11}(t) = \frac{2}{\pi} \int_0^\infty \text{Re} Z_{11}(j\omega) \cos \omega t \, d\omega \quad t>0 \ --.$$

After equation (6) shown between lines 24 to 29 -- t>o -- should appear on a separate line.

Line 31 should read $-- Z_{12}(t) = R\left[nmf_s \frac{\sin \pi nmf_s(t-t_o)}{\pi nmf_s(t-t_o)} \right. --$.

Line 42 should read $-- Z_{12}(t) = mRf_s \frac{\sin \pi mf_s(t-t_o)}{\pi mf_s(t-t_o)} \quad t>0 \ --$.

Line 56 should read $-- \int_0^\infty \text{Re} Z_{in}(j\omega) d\omega = \frac{\pi}{2c} \ --$.

Column 6, line 22 should read $-- i(t) = \frac{E_o}{\omega_o (L+L')} \sin \omega_o t \ --$.

Line 50, "C and C'" should read -- c and c' --.

Line 70, "sin x/x" should read -- $\frac{\sin x}{x}$ --.

Column 12, line 29 "228" should read -- 230 -- and "230" should read -- 228 --.

Column 14, line 3 "M and M" should read -- M' and M --.

Column 18, line 2 "M'(2N'-1)/4" should read -- M(2N-1)/4 --.

Signed and sealed this 13th day of April 1971.

(SEAL)
Attest:

EDWARD M. FLETCHER, JR.　　　　　WILLIAM E. SCHUYLER, JR.
Attesting Officer　　　　　　　　Commissioner of Patents